(No Model.)

L. C. WYLLY.
TROLLING SPOON.

No. 261,194. Patented July 18, 1882.

WITNESSES:
Fred. G. Dieterich
Charles N. Baker

INVENTOR.
Lewis C. Wylly
By Chas. J. Gooch
his ATTORNEY.

UNITED STATES PATENT OFFICE.

LEWIS C. WYLLY, OF PATTERSON, GEORGIA.

TROLLING-SPOON.

SPECIFICATION forming part of Letters Patent No. 261,194, dated July 18, 1882.

Application filed April 26, 1882. (No model.)

*To all whom it may concern:*

Be it known that I, LEWIS C. WYLLY, a citizen of the United States of America, residing at Patterson, in the county of Pierce and State of Georgia, have invented certain new and useful Improvements in Trolling-Spoons; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of baits or decoys used by fisherman known as "spinning baits" and "trolling-spoons," wherein the bait consists of a piece of bright metal above the hook, and arranged to revolve rapidly while it is being driven or drawn through the water in the kind of fishing called "trolling."

The invention consists in a certain improved construction of screw or scroll spinner, and in the method of attachment thereto of the hooks, as will be hereinafter described and claimed.

Figure 1:
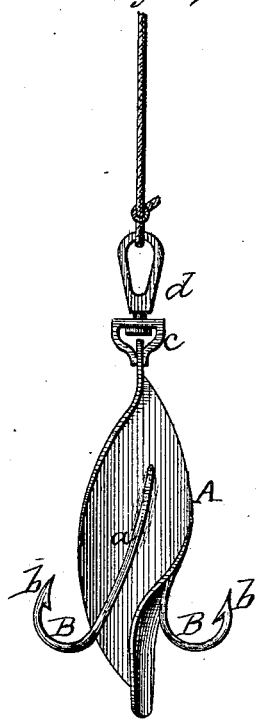
Figure 2:
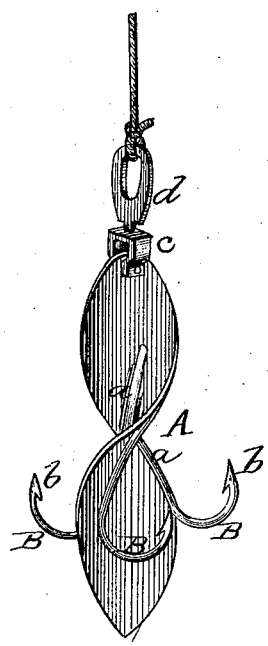

In the drawings, Figure 1 represents an elevation of the spinner with fishing-line attached. Fig. 2 represents a perspective view of the spinner.

A represents the spinner proper, which is formed out of a single piece of metal, either side of which is brightened or colored, as may be desired or found most suitable to render the same most attractive to fish. This spinner is constructed in the form of a complete elongated screw, with taper or convex ends, as clearly shown in the drawings. This form of construction renders it self-supporting while in the water and dispenses with the necessity of employing air-chambers or other supporting devices of cylindrical, conical, or other form to keep the spinner in proper and steady position while in use. In the form shown in the drawings three hooks, B, are employed. These hooks consist each of a stem, $a$, and a barb, $b$. The stems $a$ are of curved form to correspond with the curved shape of the faces of the spiral or screw, and are rigidly secured, by soldering or other suitable means, to the faces of said spiral. These hooks are attached to the screw or spiral at regular intervals of one-third the circle, the continuous screw form of the spinner being especially adapted for the attachment of the hooks at such regular intervals. The barbed ends $b$ are extended outward from the scroll in opposite directions, so that from whatever direction the fish may approach the spinner the chances of its being caught are much greater than when the barbs extend in only one or two directions, as any fish that strikes the spinner (and it is intended to color the same so that fish will be naturally attracted to it) will surely be caught.

Practice with a spinner constructed in accordance with this invention has demonstrated that more fish can be landed with it than with any other device with which I am acquainted.

Ordinarily spinners have had the hooks upon which the fish are caught arranged at some distance from the spinning spoon. The result is that the hooks trail behind the attractive part of the troll, and the best fisherman will miss nine out of a dozen fish. In my construction, by securing the hooks directly to the screw with the barbs above the lower end, every fish striking the screw to which they are attracted will be certainly caught, as there is little, if any, chance of its escaping when once it touches the screw.

The shackle-link $c$ is securely soldered or otherwise fastened at its lower ends directly to the upper end of the screw, and receives a swivel, $d$, to which the fishing-line is attached.

Having thus described my invention, what I claim is—

1. In trolling-baits, the spinner A, consisting of a single piece of metal of elongated screw form, and having taper or convex ends, substantially as and for the purpose set forth.

2. The elongated screw spinner A, having hooks B rigidly secured to the faces of said screw at equidistant intervals, substantially as and for the purpose set forth.

In testimony whereof I affix my signature in presence of two witnesses.

LEWIS C. WYLLY.

Witnesses:
 A. L. GRINER,
 LEWIS THOMAS.